United States Patent
Su (10) Patent No.: US 7,351,137 B2
(45) Date of Patent: Apr. 1, 2008

(54) HEAT DISSIPATING FAN WITH MANUAL ADJUSTMENT ROTATIONAL SPEED

(75) Inventor: Steven Su, Taoyuan (TW)

(73) Assignee: Enermax Technology Corporation, Taoyuan (TW)

(*) Notice: Subject to any disclaimer, the term of this patent is extended or adjusted under 35 U.S.C. 154(b) by 666 days.

(21) Appl. No.: 10/880,499

(22) Filed: Jul. 1, 2004

(65) Prior Publication Data

US 2005/0276694 A1 Dec. 15, 2005

(30) Foreign Application Priority Data

Jun. 14, 2004 (TW) ............................. 93117090 A (51) Int. Cl.
*H05K 5/00* (2006.01)
(52) U.S. Cl. ................. 454/184; 454/185; 312/236
(58) Field of Classification Search ............. 454/184, 454/185, 195; 312/236; 361/385
See application file for complete search history.

(56) References Cited

U.S. PATENT DOCUMENTS 5,544,012 A * 8/1996 Koike ..................... 361/695
5,851,143 A * 12/1998 Hamid ..................... 454/57
6,164,369 A * 12/2000 Stoller ................... 165/104.33
6,186,890 B1 * 2/2001 French et al. ............. 454/184
6,309,296 B1 * 10/2001 Schwenk et al. .......... 454/184
6,592,449 B2 * 7/2003 Cipolla et al. ............ 454/184
6,847,013 B2 * 1/2005 Audette et al. ........... 219/400
6,960,127 B1 * 11/2005 Curen ..................... 454/184
7,097,556 B2 * 8/2006 Su ........................ 454/184

* cited by examiner

*Primary Examiner*—Derek S. Boles
(74) *Attorney, Agent, or Firm*—Troxell Law Office, PLLC

(57) ABSTRACT

Disclosed is a rotational speed adjustment device or switch that is provided in a corner screw hole at a front or back of a heat dissipating fan frame, the rotational speed adjustment device or switch being electrically connected to a power source of the fan by means of a power cord or other conductive metals, the adjustment device or switch being extended with a knob that is individually exposed out of the fan frame, the heat dissipating fan may be installed in any space that requires heat dissipation or to an outer periphery of a unit casing, to allow a user to adjust rotational speed of the heat dissipating fan at one's desire at any time.

5 Claims, 8 Drawing Sheets

HEAT DISSIPATING FAN WITH MANUAL ADJUSTMENT ROTATIONAL SPEED

FIELD OF INVENTION

This invention provides a heat dissipating fan with manual adjustment rotational speed.

BACKGROUND

The rapid development of electronic technology results in wide applications of such electronic technology in most of industrial equipment. To ensure the optimum heat dissipating effects, installation of plural heat dissipating fans in a mechanism may help to exhaust heat by enhancing circulation between air within an enclosed environment of electronic equipment and air from the external environment, to prevent overheating of the equipment, which would cause unstable operation and component damages, and eventually fire hazards, such as in a "computer PC" as a common example.

The rotational speed RPM of conventional heat dissipating fans are adjusted or configured by the manufacture during fabrication, but not by users. Though such a state of operation by fixed rotational speed is able to provide steady airflow, it cannot efficiently discharge heat generated during high load capacity. To maximize the heat dissipating efficiency, some manufactures design the fans to be operated under high rotational speed in order to provide a higher airflow rate, while increasing the operation noises at the same time. It is, thus, relatively difficult to find equilibrium between heat dissipating efficiency and noise interferences in the application of fans of high rotational speed.

As commonly known, the square frame employed by a heat dissipating fan is usually provided with two to four penetrating screw holes at four corners of the frame, where screws are then implemented to secure the heat dissipating fan to a designated location. Such an installation measure has become the standard specifications in the industry.

Accordingly, this invention utilizes the screw holes that are provided to the heat dissipating fan, without altering or destructing the dimensions, installation measure and the basic structure of the original heat dissipating fan, to provide a rotational speed adjusting knob or switch at an appropriate location of one of the screw holes located at the front or back of the heat dissipating fan frame, which frame may either be extruded from aluminum or injection molded by plastic, wherein the knob is individually exposed out of the fan frame to serve as means for the user to manually adjust the rotational speed of the heat dissipating fan at one's desire.

SUMMARY OF INVENTION

This invention provides a heat dissipating fan with manual adjustment rotational speed, characterized in: a rotational speed adjustment device or switch provided in a corner screw hole at the front or back of a heat dissipating fan frame that is extruded from aluminum or injection molded by plastic, the rotational speed adjustment device or switch being electrically connected to a power source of the fan by means of a power cord or other conductive metals, the adjustment device or switch being extended with a knob that is individually exposed out of the fan frame, the heat dissipating fan may be installed in any space that requires heat dissipation or to an outer periphery of a main unit casing, to allow a user to adjust rotational speed of the heat dissipating fan at one's desire at any time.

BRIEF DESCRIPTION OF THE DRAWINGS

These and other modifications and advantages will become even more apparent from the following detailed description of a preferred embodiment of the invention and from the drawings in which.

PREFERRED EMBODIMENTS & DETAILED DESCRIPTION OF THE INVENTION

Figure 1:
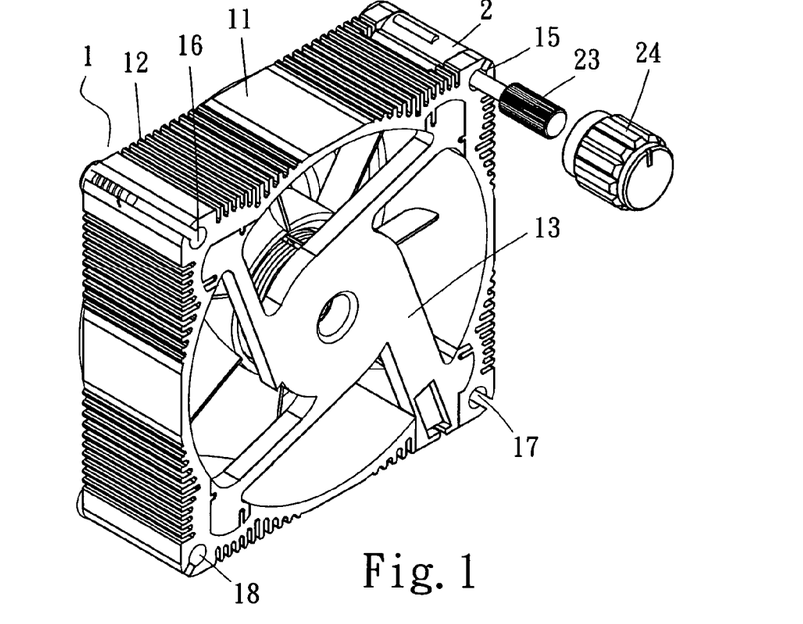
FIG. 1 is a perspective view of an embodiment for the aluminum extruded heat dissipating fan of a heat dissipating fan with manual adjustment rotational speed according to this invention.
Figure 2:
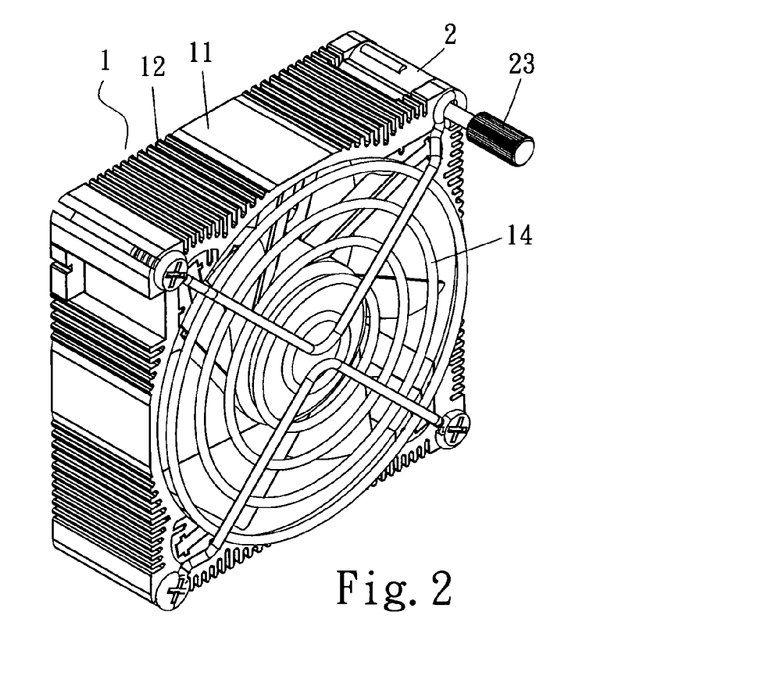
FIG. 2 is a backside perspective view of the aluminum extruded heat dissipating fan of a heat dissipating fan with manual adjustment rotational speed according to this invention.
Figure 3:
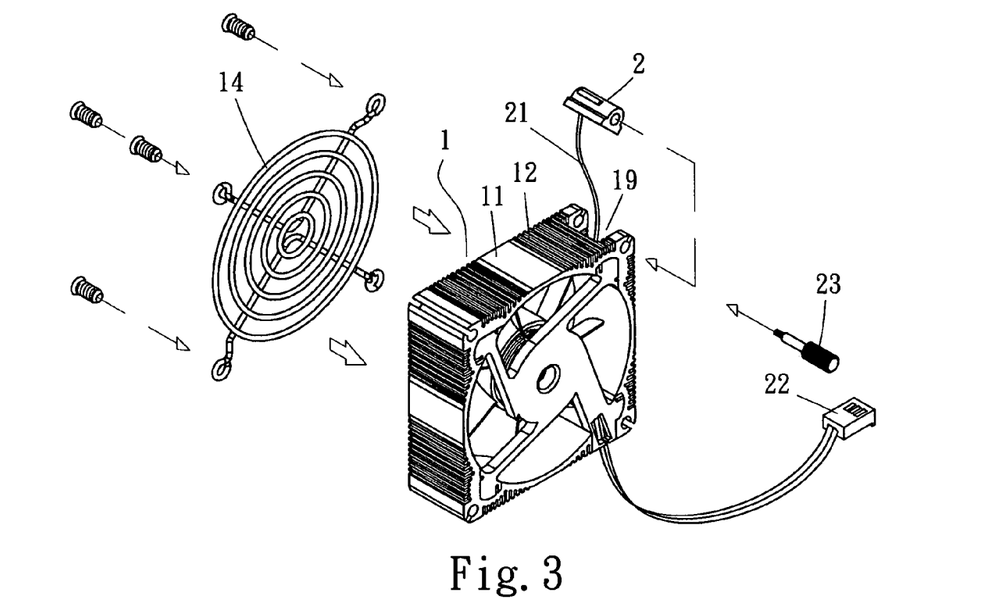
FIG. 3 is an exploded, perspective view of the aluminum extruded heat dissipating fan of a heat dissipating fan with manual adjustment rotational speed according to this invention.

As shown in FIG. 1, FIG. 2 and FIG. 3, the heat dissipating fan with manual adjustment rotational speed of this invention is realized by an aluminum extruded heat dissipating fan 1. Heat dissipating fins 12 are provided on a periphery surface of an aluminum extruded frame 11. A retaining plate 13 is secured to a center of a front side thereof. A net cover 14 is secured to a back by screws. The aluminum extruded frame 11 is formed with an opening 19 at an appropriate location of one of the corner screw holes 15, 16, 17, 18 at the front or back thereof for receiving the rotational speed adjustment device or switch 2. The rotational speed adjustment device or switch 2 is electrically connected to a power source of the fan by means of a power cord 21 or other conductive metals, where the power cord 21 includes a terminal 22 for connecting to the power source.

The adjustment device or switch 2 includes a knob 23 extending through the screw hole, to expose the knob 23 out of the aluminum extruded frame 11. The knob 23 may be provided with a handle 24 for easy operation.

Figure 4:
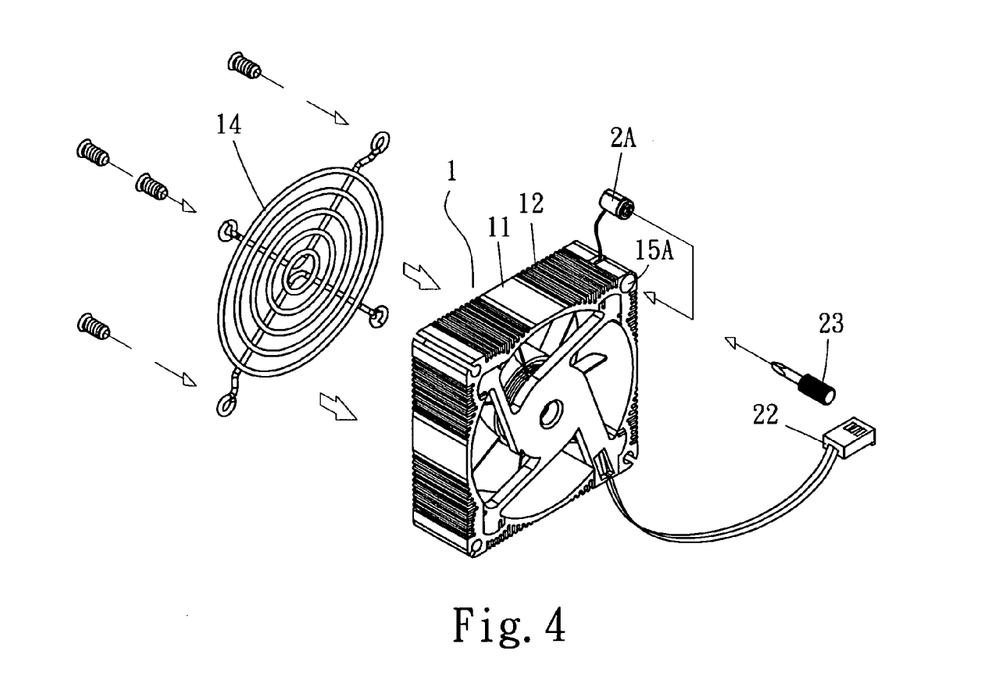
FIG. 4 is a perspective view of another embodiment of the aluminum extruded heat dissipating fan of a heat dissipating fan with manual adjustment rotational speed according to this invention.

As shown in FIG. 4, one of the screw holes 15 on the aluminum extruded frame 11 may be expanded to form a large screw hole 15A, and the rotational speed adjustment device or switch 2A in a cylindrical configuration is directly inserted into the large screw hole 15A.

Figure 5:
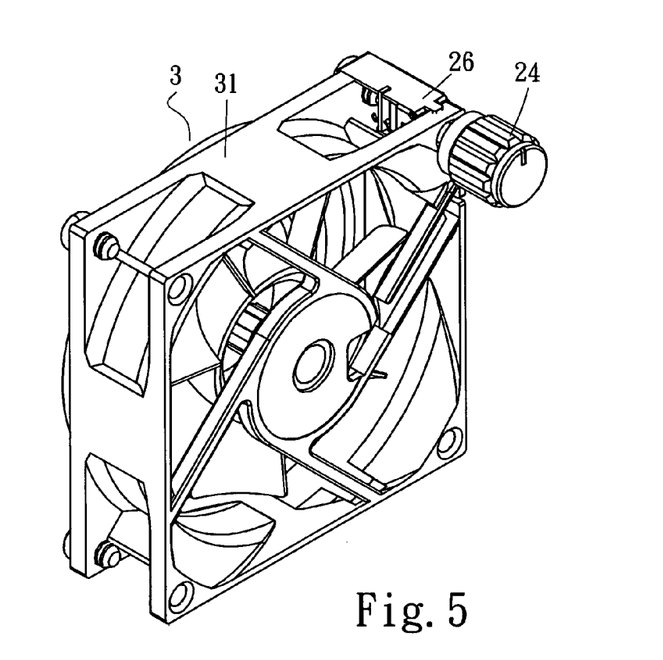
FIG. 5 is a perspective view of an embodiment for the plastic heat dissipating fan of a heat dissipating fan with manual adjustment rotational speed according to this invention.
Figure 6:
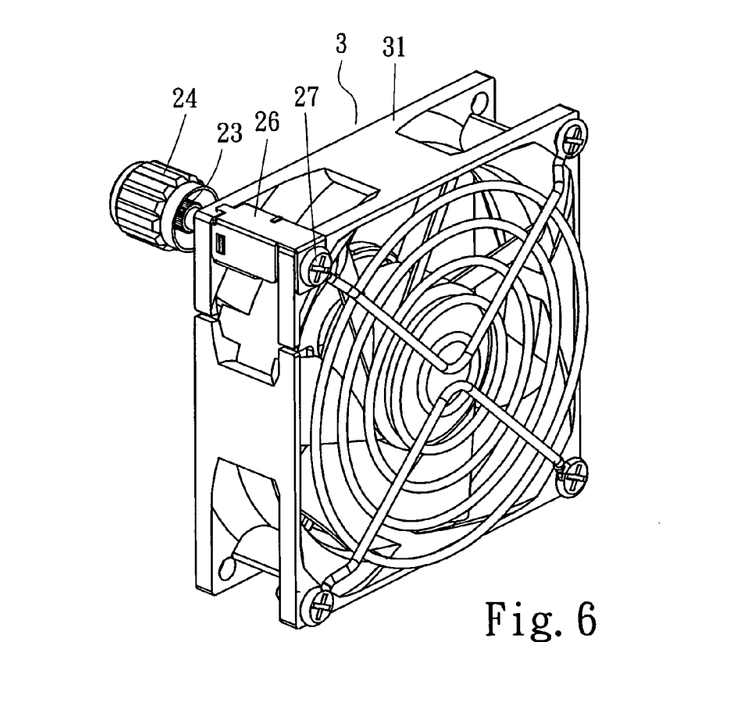
FIG. 6 is a backside perspective view of the plastic heat dissipating fan of a heat dissipating fan with manual adjustment rotational speed according to this invention.
Figure 7:
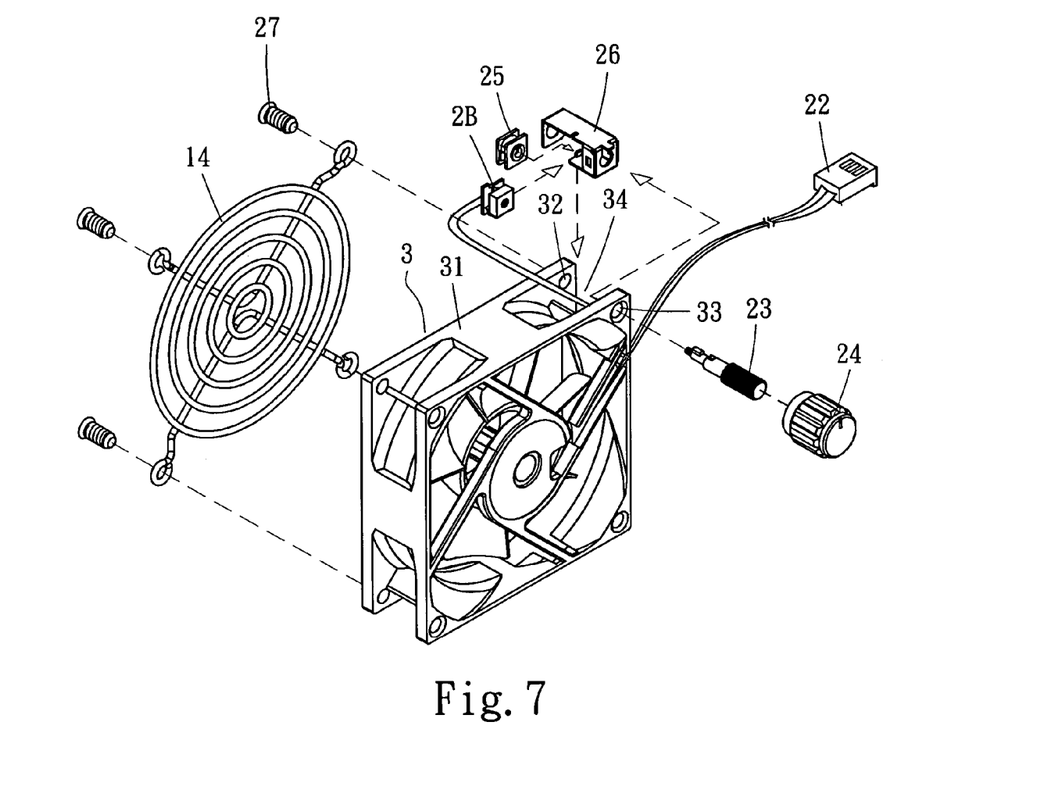
FIG. 7 is an exploded, perspective view of the plastic heat dissipating fan of a heat dissipating fan with manual adjustment rotational speed according to this invention.
Figure 8:
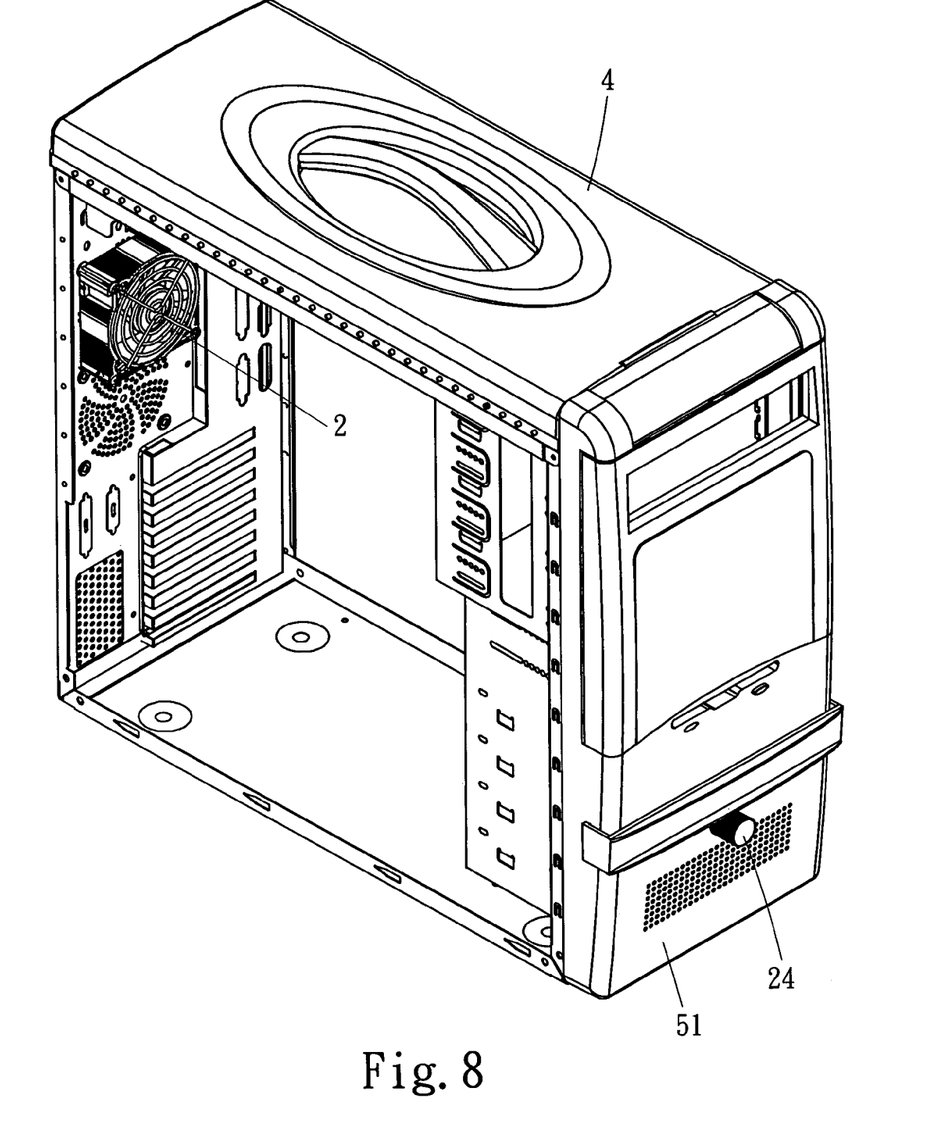
FIG. 8 is a perspective view illustrating the embodiment of the aluminum extruded heat dissipating fan of a heat dissipating fan with manual adjustment rotational speed according to this invention being applied to a computer unit.
Figure 9:
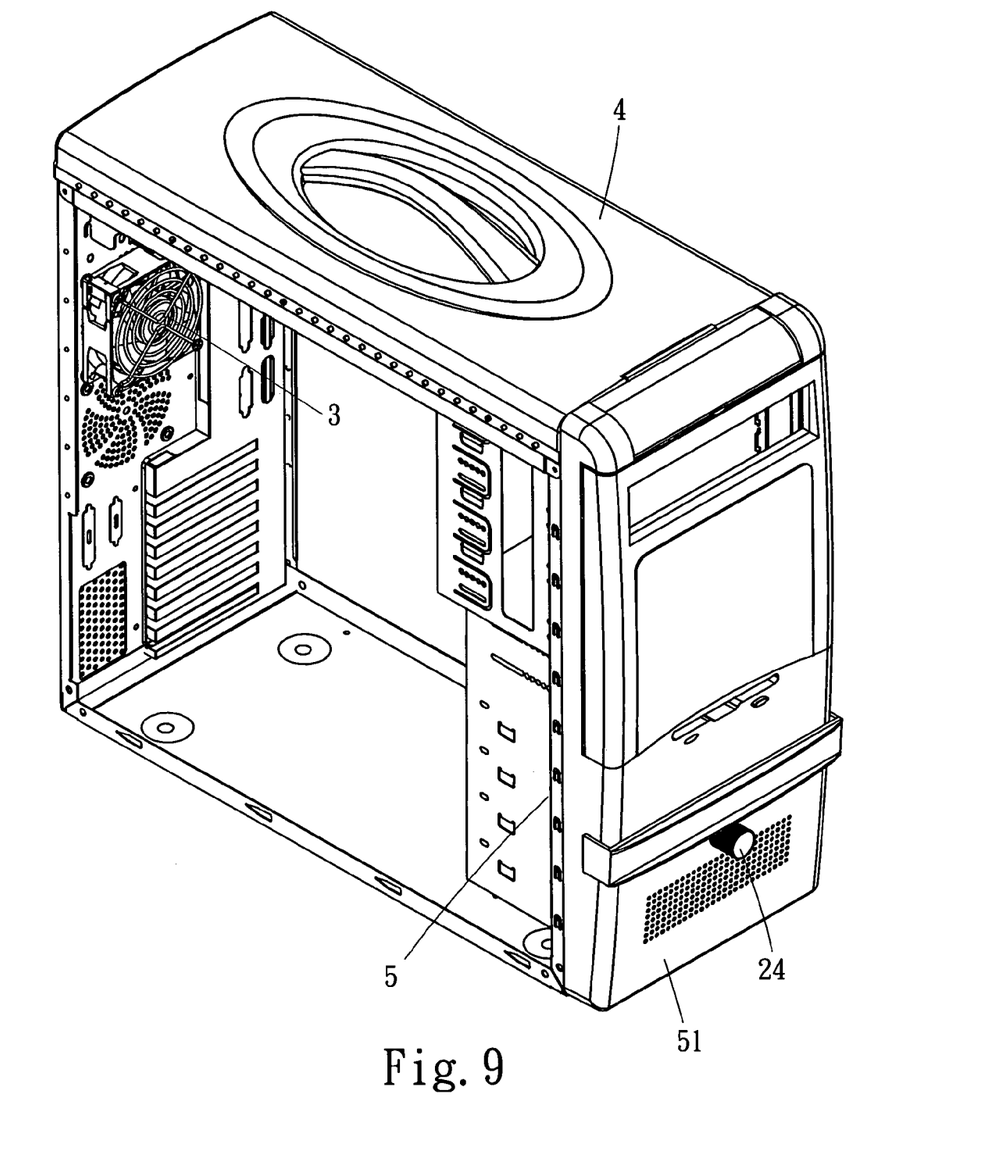
FIG. 9 is a perspective view illustrating another embodiment of the plastic heat dissipating fan of a heat dissipating fan with manual adjustment rotational speed according to this invention being applied in a computer unit.
Figure 10:
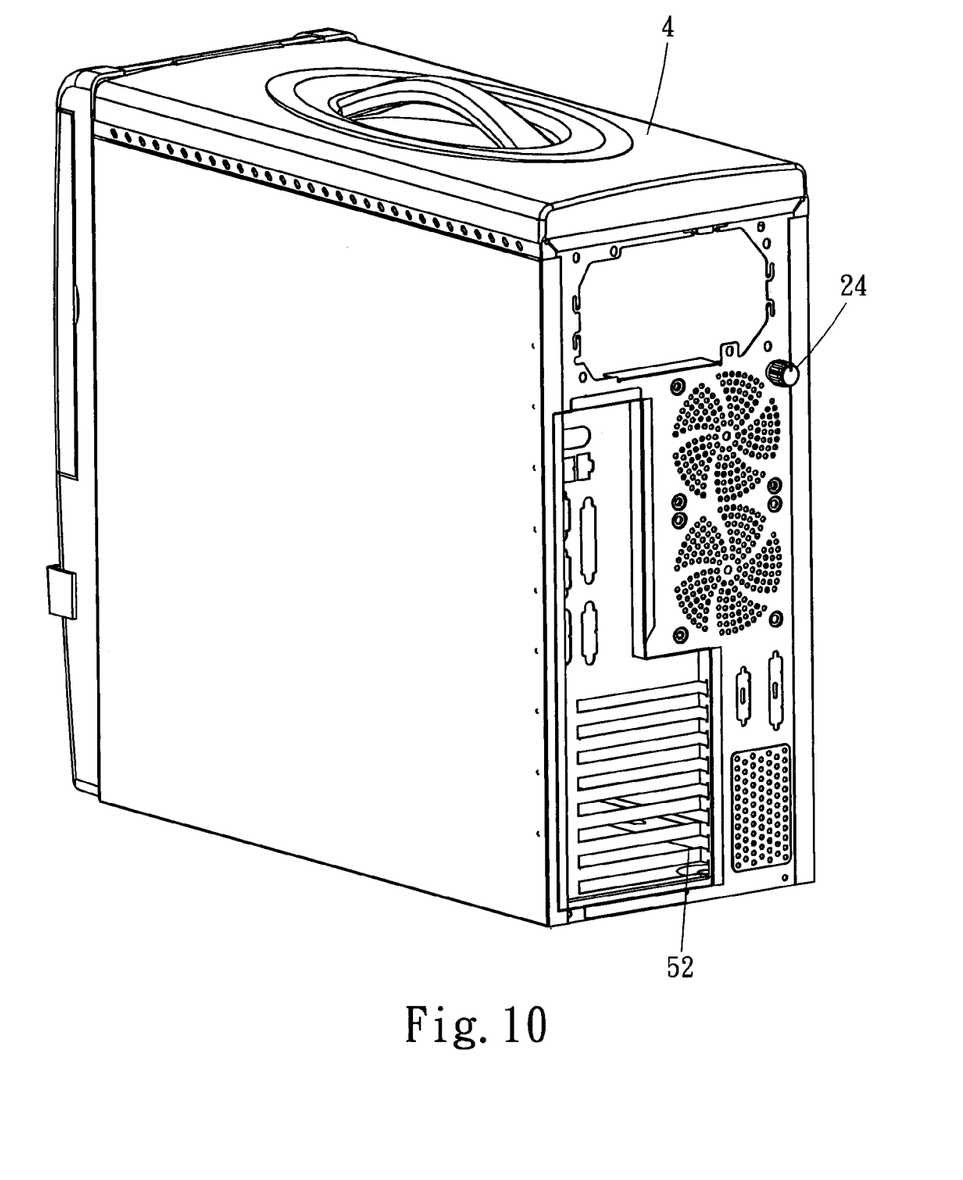
FIG. 10 is a perspective view illustrating the embodiment of the aluminum extruded heat dissipating fan of a heat dissipating fan with manual adjustment rotational speed according to this invention being applied to the back of a computer unit.
Figure 11:
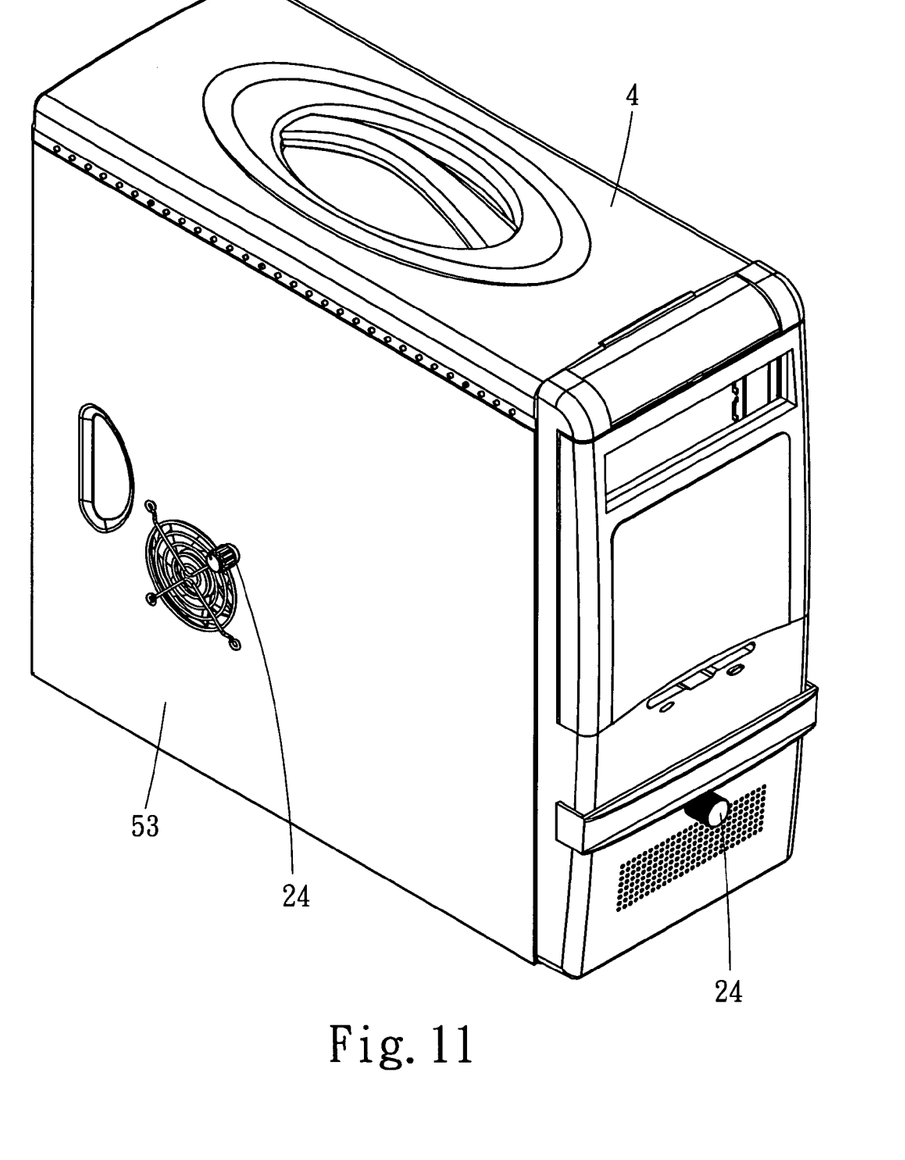
FIG. 11 is a perspective view illustrating an alternative embodiment where the heat dissipating fan with manual adjustment rotational speed according to this invention is applied to a computer unit.

As shown in FIG. 5, FIG. 6 and FIG. 7, the heat dissipating fan structure with manual adjustment rotational speed of this invention may also implement a plastic heat dissipating fan 3 having a plastic frame 31 made by plastic injection forming. As such, a rotational speed adjustment device or switch 2B and a thread head 25 are placed in a casing 26 at an in-between space 34 between aligning screw holes 32, 33. The casing 26 having the rotational speed adjustment device or switch 2B and the thread head 25 is placed into the above in-between space 34 and then secured by a screw 27 from a back thereof.

Similarly, the adjustment device or switch 2B includes a knob 23 extending through the screw hole 32, to expose the knob 23 out of the plastic extruded frame 31. The knob 23 may be provided with a handle 24 for easy operation. The rotational speed adjustment device or switch 2B is electrically connected to a power source of the fan by means of a power cord 21 or other conductive metals, where the power cord 21 includes a terminal 22 for connecting to the power source.

As shown in the perspective views of FIG. 8, FIG. 9, FIG. 10 and FIG. 11, when this invention is installed to a computer unit 4, the aluminum extruded heat dissipating fan 1 or plastic heat dissipating fan 3 of the heat dissipating fan with manual adjustment rotational speed may be installed at any location in a computer unit, or an inner edge of a front 51, lateral 52 or back 53 of a computer housing 5; wherein the knob 23 or a handle 24 extending from the adjustment device or switch 2 extends outwards, or is of an individual component to be inserted from an outside, to allow the user to adjust the rotational speed of the aluminum extruded heat dissipating fan 1 or plastic heat dissipating fan 3 by one's fingers from an exterior of the computer unit at any time so as to control and adjust the heat dissipating effects.

According to this invention, the installation of the aluminum extruded heat dissipating fan 1 or plastic heat dissipating fan 3 of the heat dissipating fan with manual adjustment rotational speed to a PC unit is only one form of application, while such fans can be installed at any location that requires heat dissipation in actual applications.

What is claimed is:

1. A heat dissipating fan with manual adjustment rotational speed, characterized with: a rotational speed adjustment device or switch provided in a corner screw hole at a front or back of a heat dissipating fan frame, the rotational speed adjustment device or switch being electrically connected to a power source of the fan by means of a power cord or other conductive metals, the adjustment device or switch being extended with a knob that is individually exposed out of the fan frame, the heat dissipating fan may be installed in any space that requires heat dissipation or to an outer periphery of a unit casing, to allow a user to adjust rotational speed of the heat dissipating fan at one's desire at any time, said heat dissipating fan with manual adjustment rotational speed includes one of the following: a heat dissipating fan that is extruded from aluminum or injection molded by plastic, said aluminum extruded heat dissipating fan is formed with heat dissipating fins at a periphery surface of an aluminum extruded frame, the aluminum extruded frame being formed with an opening at an appropriate location of one of the corner screw holes at the front or back thereof for receiving the rotational speed adjustment device or switch.

2. The heat dissipating fan with manual adjustment rotational speed of claim 1, wherein one of said screw holes on the aluminum extruded frame is expanded to form a large screw hole, and wherein the rotational speed adjustment device or switch in a cylindrical configuration is directly inserted into the large screw hole.

3. A heat dissipating fan with manual adjustment rotational speed, characterized with: a rotational speed adjustment device or switch provided in a corner screw hole at a front or back of a heat dissipating fan frame, the rotational speed adjustment device or switch being electrically connected to a power source of the fan by means of a power cord or other conductive metals, the adjustment device or switch being extended with a knob that is individually exposed out of the fan frame, the heat dissipating fan may be installed in any space that requires heat dissipation or to an outer periphery of a unit casing, to allow a user to adjust rotational speed of the heat dissipating fan at one's desire at any time, said heat dissipating fan with manual adjustment rotational speed includes one of the following: a heat dissipating fan that is extruded from aluminum or injection molded by plastic, in the plastic heat dissipating fan, the rotational speed adjustment device or switch and a thread head are placed in a casing at an in-between space between aligning screw holes of a plastic frame made by plastic injection molding, where the casing having the rotational speed adjustment device or switch and the thread head is placed into the above in-between space and then secured by a screw from a back thereof.

4. A heat dissipating fan with manual adjustment rotational speed, characterized with: a rotational speed adjustment device or switch provided in a corner screw hole at a front or back of a heat dissipating fan frame, the rotational speed adjustment device or switch being electrically connected to a power source of the fan by means of a power cord or other conductive metals, the adjustment device or switch being extended with a knob that is individually exposed out of the fan frame, the heat dissipating fan may be installed in any space that requires heat dissipation or to an outer periphery of a unit casing, to allow a user to adjust rotational speed of the heat dissipating fan at one's desire at any time, said aluminum extruded heat dissipating fan or plastic heat dissipating fan of the heat dissipating fan with manual adjustment rotational speed is adapted to be installed at any location in a computer unit, or an inner edge of a front, lateral or back of a computer housing; and wherein the knob or a handle extending from the adjustment device or switch extends outwards, or is of an individual component to be inserted from the outside, to allow the user to adjust the rotational speed of the aluminum extruded heat dissipating fan or plastic heat dissipating fan by one's fingers from an exterior of the computer unit at any time.

5. The heat dissipating fan with manual adjustment rotational speed of claim 1, wherein the aluminum extruded heat dissipating fan or plastic heat dissipating fan of the heat dissipating fan with manual adjustment rotational speed is not limited to be installed to a PC unit, but any location that requires heat dissipation in actual applications.

* * * * *